(12) United States Patent
Natsume et al.

(10) Patent No.: US 8,562,893 B2
(45) Date of Patent: Oct. 22, 2013

(54) MOLDING METHOD AND MOLDING DEVICE FOR FORMING IMPELLER

(75) Inventors: Masami Natsume, Toyota (JP); Tetsuo Shimizu, Seto (JP); Tomoo Sagawa, Okazaki (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 89 days.

(21) Appl. No.: 13/284,225

(22) Filed: Oct. 28, 2011

(65) Prior Publication Data

US 2012/0104654 A1 May 3, 2012

(30) Foreign Application Priority Data

Oct. 29, 2010 (JP) ................................. 2010-244520

(51) Int. Cl.
*B29C 45/44* (2006.01)
(52) U.S. Cl.
USPC ............. 264/318; 249/64; 264/334; 425/556; 425/577; 425/DIG. 58
(58) Field of Classification Search
USPC ............... 264/310, 318, 328.1, 334; 425/556, 425/577, DIG. 58; 249/59, 64
See application file for complete search history.

(56) References Cited

U.S. PATENT DOCUMENTS

| 4,975,041 A * | 12/1990 | Fries et al. ................... 425/547 |
| 6,123,539 A * | 9/2000 | Miller ........................ 425/589 |
| 7,802,981 B2 * | 9/2010 | Liu et al. ..................... 425/468 |
| 2006/0291996 A1 | 12/2006 | Kubota et al. |
| 2009/0252609 A1 | 10/2009 | Kubota |

FOREIGN PATENT DOCUMENTS

| JP | 61-109608 A | | 5/1986 |
| JP | 63-171242 | * | 7/1988 |
| JP | 6-114893 A | | 4/1994 |
| JP | 2006-281378 A | | 10/2006 |
| WO | WO2005/116454 A1 | | 12/2005 |

\* cited by examiner

*Primary Examiner* — Jill Heitbrink
(74) *Attorney, Agent, or Firm* — Buchanan Ingersoll & Rooney PC

(57) ABSTRACT

A molding method for forming an impeller, includes a mold clamping process having a first mold for forming one side of blades, a second mold firmly clamped with the first mold, and a core arranged at the first mold relative to the blades, the mold clamping process clamping the first mold to the second mold in a state where the core is arranged between the first mold and the second mold, an injecting process injecting resin in a cavity obtained by the mold clamping process, and a mold removing process including the steps of releasing at least the first mold from the clamped state obtained by the mold clamping process to generate an opened portion in the first mold after the resin is hardened, rotating the core about a rotational axis toward the opened portion of the first mold, and separating the core from the resin-molded impeller.

5 Claims, 6 Drawing Sheets

MOLDING METHOD AND MOLDING DEVICE FOR FORMING IMPELLER

CROSS REFERENCE TO RELATED APPLICATIONS

This application is based on and claims priority under 35 U.S.C. §119 to Japanese Patent Application 2010-244520, filed on Oct. 29, 2010, the entire content of which is incorporated herein by reference.

TECHNICAL FIELD

This disclosure generally relates to a molding method and a molding device for forming an impeller including a main body and plural blades arranged at the main body so as to circumferentially adjoin one another.

BACKGROUND DISCUSSION

A known die-casting technique to form an impeller by a lost wax casting process is disclosed in US2006/0291996A (hereinafter referred to as Reference 1). The impeller is generally adapted to a pump rotationally driven by a predetermined drive source so as to send fluid such as water and the like, or is generally adapted to an axial flow rotor such as a gas turbine engine and the like rotationally driven by operating fluid. In particular, the impeller disclosed in Reference 1 is an impeller of a supercharger for an engine and is made of metal or the like. A die for injection-forming a sacrificial pattern utilized to die-cast the impeller is explained in Reference 1.

The die includes slide dies each slidably supported by a slide support and rotatable about a rotational axis extending along a radial direction of the impeller. The slide die includes plural cores for forming blade surfaces of blades of the impeller. The cores are rotated about the rotational axis relative to the slide support in such a way that the blade surfaces may be formed to have cross sections which extend along a flat surface perpendicular to the radial direction of the impeller so as to be inclined to a rotational axle of the impeller.

After the injection-forming process, the slide supports are moved to an outward side in the radial direction of the impeller; therefore, the cores are separated from the die-cast blade surfaces to the outward side in the radial direction while rotating about the rotational axes extending along the radial direction.

In addition, a cam plate including plural cam grooves being radially curved is rotatably arranged around the rotational axle of the impeller. The cam grooves are engaged with respective lower surfaces of the slide supports. The cam plate serves as a mechanism to separate the plural cores in conjunction with one another from the die-cast impeller toward the outward side in the radial direction.

For example, the die-casting technique disclosed in Reference 1 needs a complex and elaborate mechanism including bearings and the like so that the cores may rotate without resistance when the cores are removed from the die-cast impeller. Additionally, a mechanism to position each of the cores at a predetermined angle before the injection-forming process is required to the die-casting technique disclosed in Reference 1; therefore, the manufacturing cost of a die-casting device may increase.

Moreover, according to the die-casting technique disclosed in Reference 1, the aforementioned cam plate needs to be rotated about the rotational axle in order to remove the plural cores in conjunction with one another from the die-cast impeller. Accordingly, the cam plate may not serve as a drive source for moving a movable die covering upper ends of the blades to an upper side of the impeller after the impeller is formed by die casting. In addition, according to the die-casting technique disclosed in Reference 1, the cores are moved toward the outward side in the radial direction; therefore, a large space may be required in the radial direction of the impeller.

A need thus exists for a molding device and a molding method for forming an impeller, which are not susceptible to the drawbacks mentioned above.

SUMMARY

According to an aspect of this disclosure, a molding method for forming an impeller including a main body and a plurality of blades arranged at one surface of the main body to circumferentially adjoin one another, each of the blades being inclined at different inclination angles at radially outward and inward sides toward one side in a rotating direction of the impeller, the molding method includes a mold clamping process including a first mold for forming one side of the blades, a second mold firmly clamped with the first mold to face the first mold, and a core arranged at the first mold relative to the blades, the mold clamping process clamping the first mold to the second mold in a state where the core is arranged between the first mold and the second mold, an injecting process injecting resin in a cavity obtained by the mold clamping process, and a mold removing process including the steps of releasing at least the first mold from the clamped state obtained by the mold clamping process to generate an opened portion in the first mold after the resin is hardened, rotating the core about a rotational axis toward the opened portion of the first mold, the rotational axis extending from the radially outward side to the radially inward side of the impeller, and separating the core from the resin-molded impeller.

According to another aspect of this disclosure, a molding device for forming an impeller including a main body and a plurality of blades arranged at one surface of the main body to circumferentially adjoin one another, each of the blades being inclined at different inclination angles at radially outward and inward sides toward one side in a rotating direction of the impeller, the molding device includes a first mold forming one side of the blades, a second mold firmly clamed with the first mold to face the first mold, a core arranged at the first mold relative to the blades and being rotatable about a rotational axis, the rotational axis extending from the radially outward side to the radially inward side of the impeller, a resin injecting mechanism injecting resin in a cavity formed by the first mold, the second mold, and the core, and a mold removing mechanism releasing at least the first mold clamped with the second mold therefrom to form an opened portion in the first mold after the resin is hardened, rotating the core about the rotational axis toward the opened portion of the first mold, and separating the core from the resin-molded impeller.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1A:
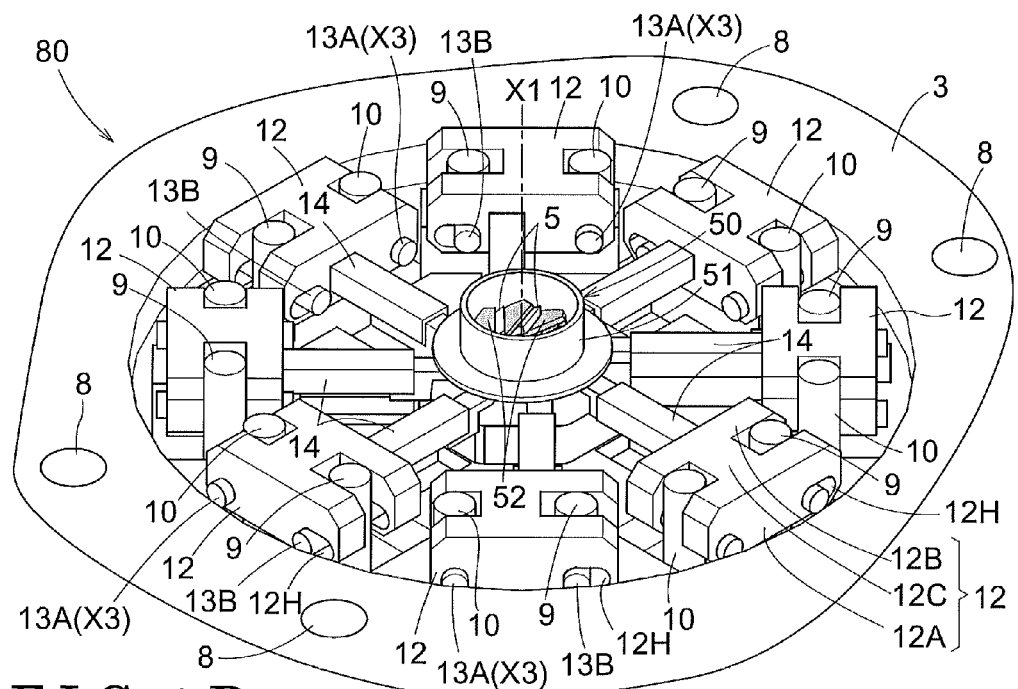
FIG. 1A is a perspective view illustrating a first state of a main portion of a molding device according to an embodiment disclosed here.
Figure 1B:
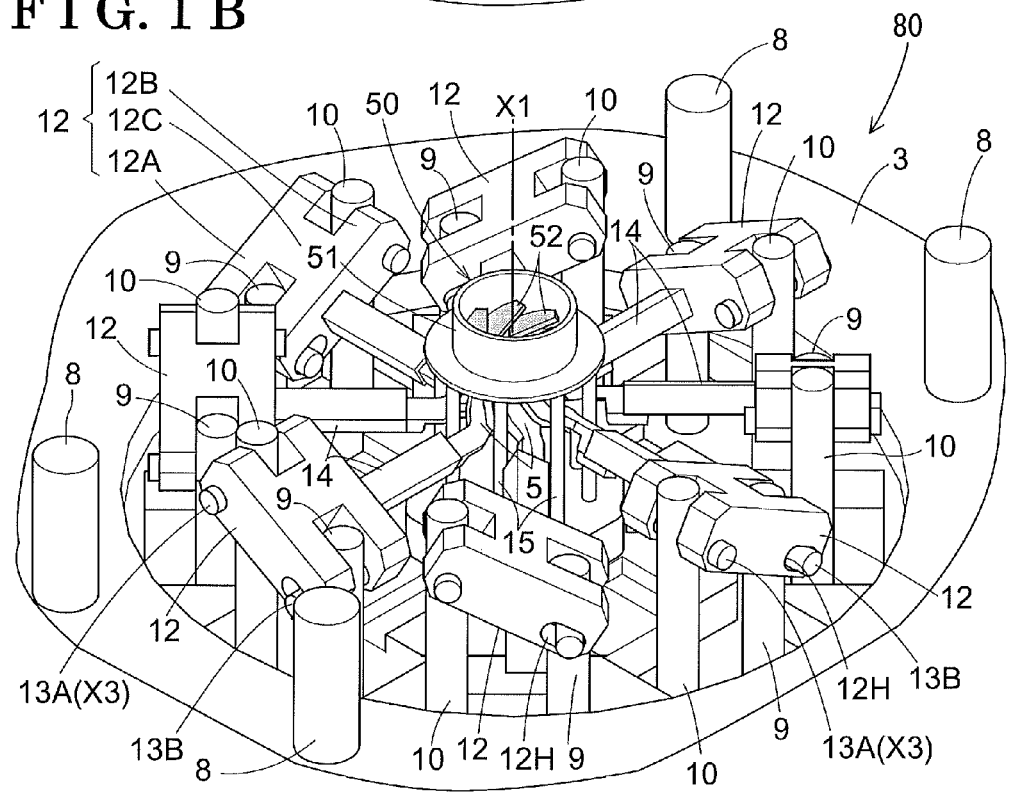
FIG. 1B is a perspective view illustrating a second state of the main portion of the molding device according to the embodiment disclosed here.

An embodiment of this disclosure will be described as follows with reference to illustrations of the attached drawings. A molding device 80 for forming an impeller 50 by resin injection molding is illustrated in each of FIGS. 1A and 1B. FIGS. 1A and 1B illustrate first and second states, respectively, of a main portion of the molding device 80. The impeller 50 is used for a water pump such as a coolant water circulating pump and the like.

[Configuration of the Molding Device]

Figure 8A:
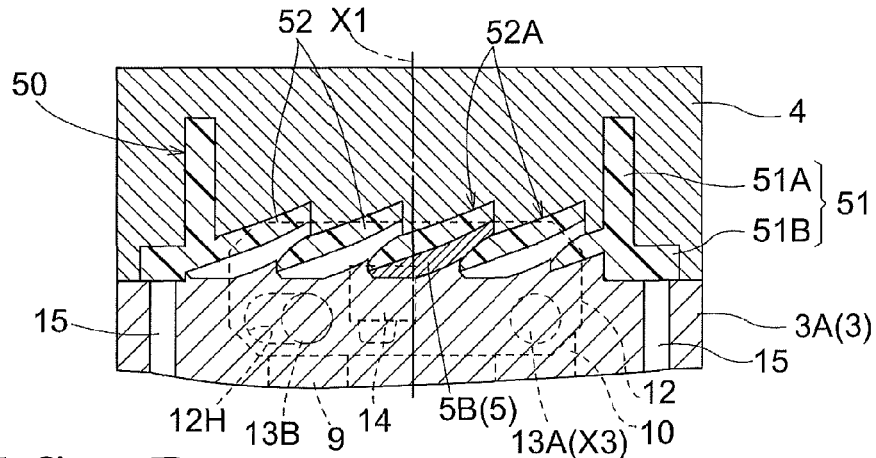
FIG. 8A is a partially broken side view illustrating a first step of a mold removing process of the molding method according to the embodiment disclosed here.
Figure 8B:
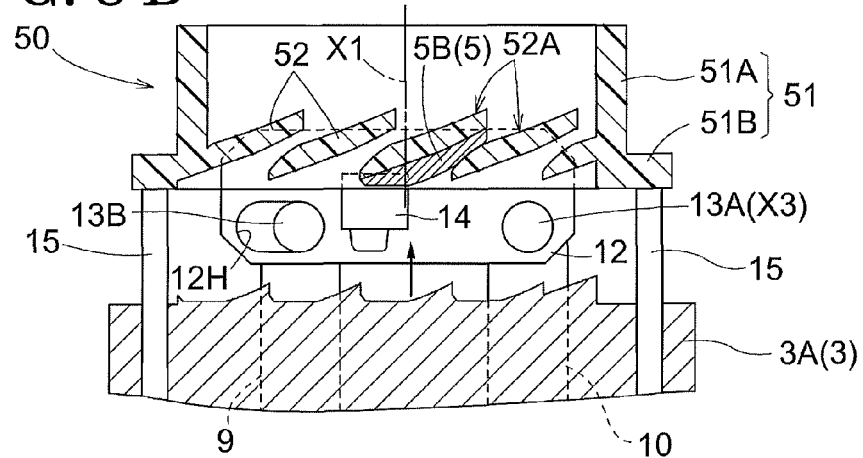
FIG. 8B is a partially broken side view illustrating a second step of the mold removing process of the molding method according to the embodiment disclosed here.
Figure 8C:
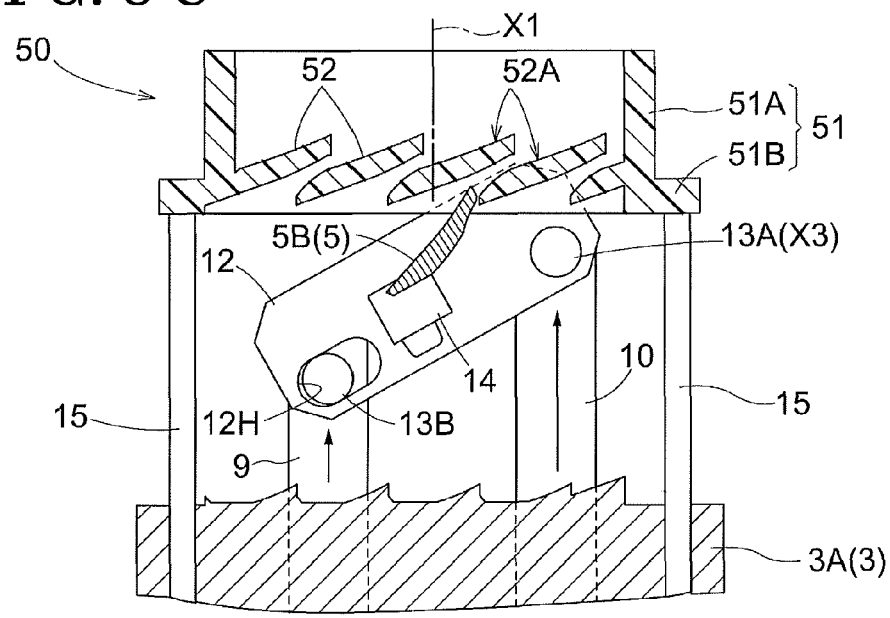
FIG. 8C is a partially broken side view illustrating a third step of the mold removing process of the molding method according to the embodiment disclosed here.

As illustrated in FIGS. 1A and 1B, the impeller 50 includes a cylindrical main body 51 and eight blades 52. The blades 52 are integrally formed with an inner surface (one surface) of the main body 51. The blades 52 arranged at the inner surface of the main body 51 circumferentially adjoin one another. As illustrated in FIGS. 8A, 8B, and 8C, a flange portion 51B is integrally formed with a lower end of a cylindrical portion 51A of the main body 51 so as to extend outward in a radial direction of the impeller 50. An inner circumferential surface of the cylindrical portion 51A is connected to a lower surface of the flange portion 51B by an annular smoothly curved surface surrounding a rotational axle X1 of the impeller 50. Each of the blades 52 extends from a portion of the inner circumferential surface of the cylindrical portion 51A via the annular smoothly curved surface to an inner circumferential peripheral portion of the lower surface of the flange portion 51B. In particular, the blade 52 is inclined from the annular smoothly curved surface toward one side in a circumferential direction (rotating direction) of the impeller 50 relative to the rotational axle X1.

Figure 3:
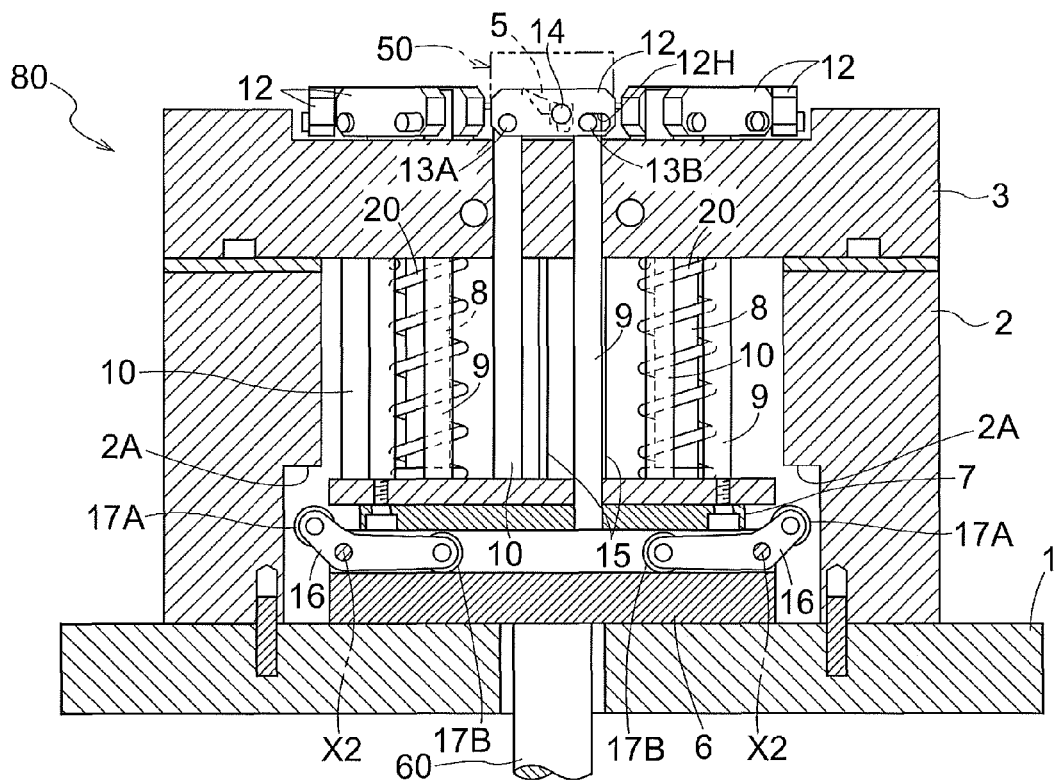
FIG. 3 is a broken side view of the main portion of the molding device according to the embodiment disclosed here.
Figure 5:
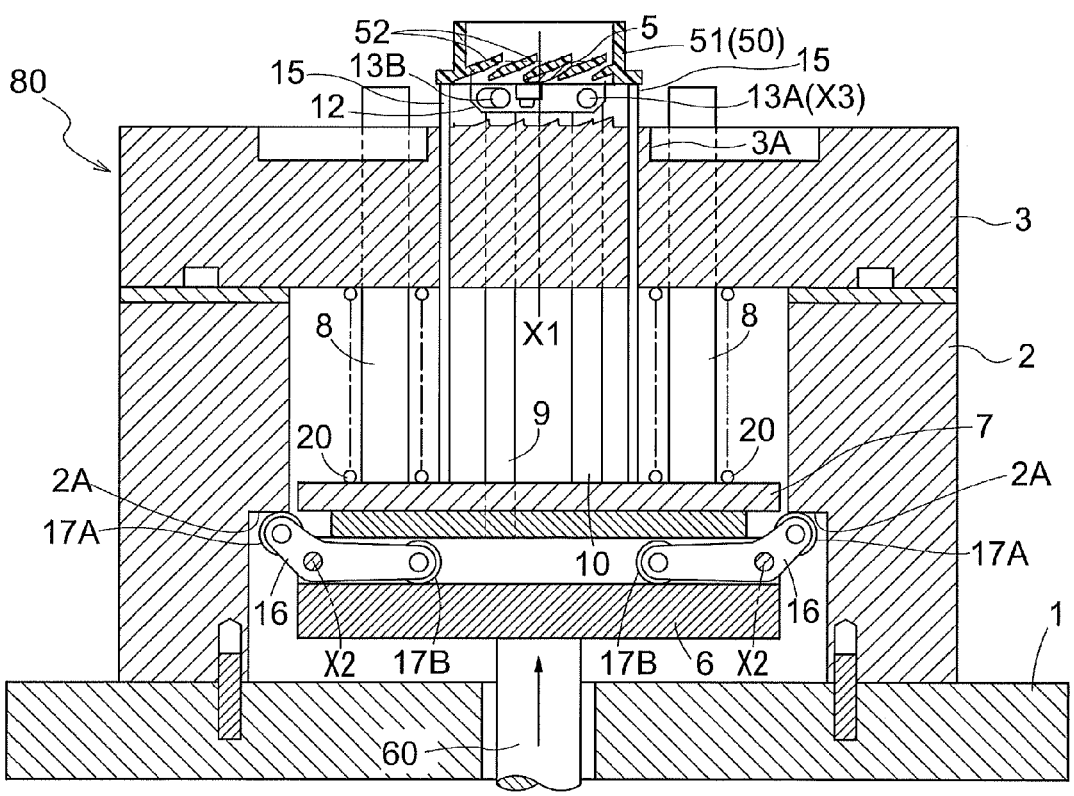
FIG. 5 is a side view illustrating a change of the main portion of the molding device in the process of the molding method according to the embodiment disclosed here.

As illustrated in FIG. 3, the molding device 80 includes a base 1 having a flat plated shape, wall portions 2 vertically formed at an upper surface of the base 1 so as to extend upward therefrom, and a tabular member 3 arranged so as to connect respective upper ends of the wall portions 2. Each of the wall portions 2 has a rectangular shape when seen in planar view. As illustrated in FIG. 5, a first outer mold 3A for forming the main body 51 of the impeller 50 by injection molding is arranged at a center portion of an upper surface of the tabular member 3. A boss portion for forming a room penetrating through a central portion of the impeller 50 is arranged at the first outer mold 3A so as to protrude upward along the rotational axle X1. The first outer mold 3A corresponds to a first mold for forming a lower side (one side) of the blades 52.

Figure 4:
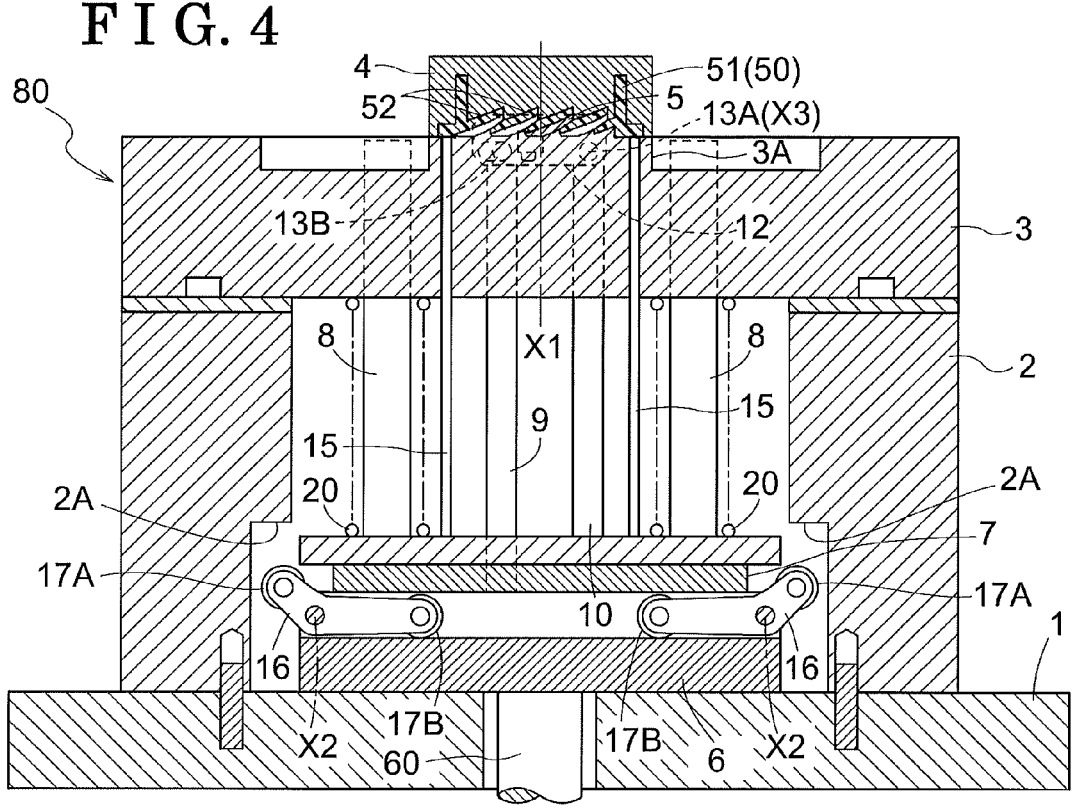
FIG. 4 is a side view illustrating a change of the main portion of the molding device in the process of a molding method for forming an impeller, according to the embodiment disclosed here.

An injection mold for forming the impeller 50 by injection molding includes the first outer mold 3A, a second outer mold 4 corresponding to a second mold and arranged at an upper surface of the first outer mold 3A so as to face the first outer mold 3A along a vertical direction seen in FIG. 4, and cores 5 for forming blade surfaces 52A (see FIGS. 6, 8A, 8B, and 8C) of the blade 52. A cavity is formed by the first outer mold 3A, the second outer mold 4, and the cores 50. In particular, resin is injected into the cavity; thereby, the cores 5 form the inclined blade surfaces 52A.

The second outer mold 4 is movably driven by a driving device between a molding position where the second outer mold 4 is positioned in a firm contact manner with the upper surface of the first outer mold 3A (see FIG. 4) and a mold removed position where the second outer mold 4 is removed or detached upward from the first outer mold 3A (see FIG. 5). A mechanism to move the cores 5 between the molding position and the mold removed position will be described below.

As illustrated in FIG. 3, a drive shaft 60 vertically reciprocating by means of a force such as hydraulic pressure includes a first movable plate 6 and a second movable plate 7. The first movable plate 6 and the second movable late 7 constitute portions of first and second support members, respectively. The first movable plate 6 is arranged at an upper end of the drive shaft 60 between the base 1 and the tabular member 3. The second movable plate 7 is arranged at an upper surface of the first movable plate 6 between the base 1 and the tabular member 3. Eight extrusion pins 15 for extruding the resin-molded impeller 50 upward from the first outer mold 3A are vertically arranged at an upper surface of the second movable plate 7. Each of the extrusion pins 15 serves as a support device for supporting the resin-molded impeller 50. At least a pair of compression springs 20 is arranged between the tabular member 3 and the second movable plate 7. Each of the compression springs 20 exerts a biasing force by which the second movable plate 7 is moved downward toward the first movable plate 6.

Eight auxiliary rods 9 vertically extending (each of the auxiliary rods 9 constitutes a portion of the first support member) are arranged on the upper surface of the first movable plate 6 at substantially equal intervals in an annular form around the rotational axle X1. Eight main rods 10 (each of the main rods 10 constitutes a portion of the second support member) vertically extending are arranged on the upper surface of the second movable plate 7 at substantially equal intervals in an annular form around the rotational axle X1. The auxiliary rods 9 and the main rods 10 are arranged on the same circle in an alternating manner. In addition, plural guide rods 8 are vertically arranged on the upper surface of the second movable plate 7 and through-holes through which the guide rods 8 are vertically movably guided are formed in the tabular member 3. The auxiliary rods 9, the main rods 10, and the extrusion pins 15 are reachable to an upper side of the first outer mold 3A through respective opening guide portions formed in the tabular member 3.

Figure 2:
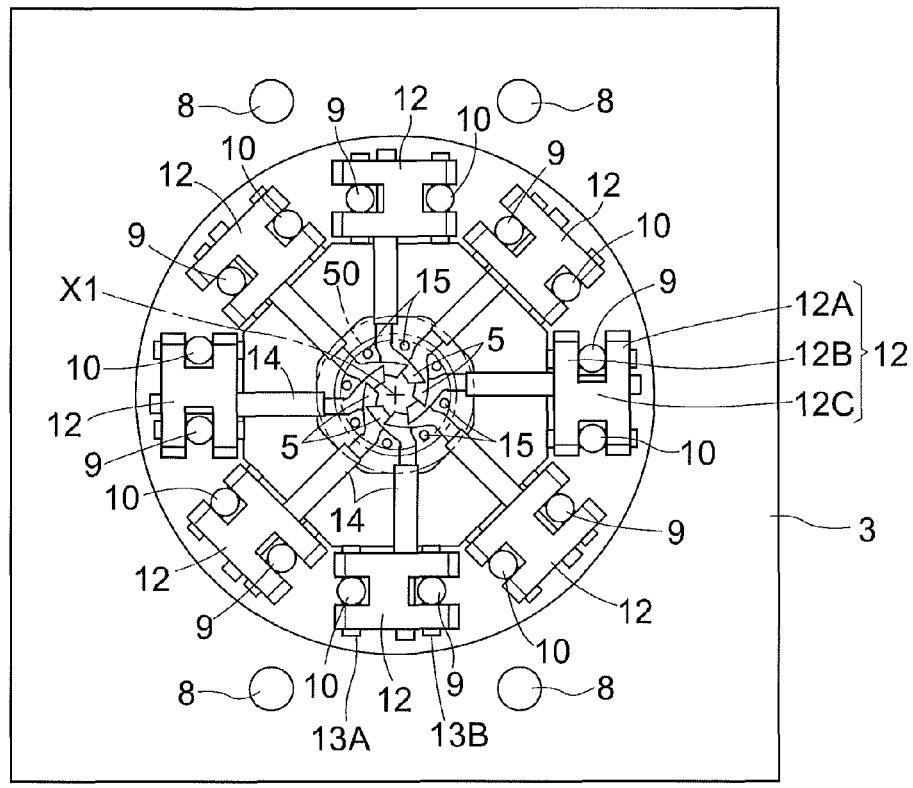
FIG. 2 is a top plan view of the main portion of the molding device according to the embodiment disclosed here.

As illustrated in FIG. 2, rotary links 12 serving as rotary members and having H-shapes in planar view are supported by and arranged between respective upper ends (respective ends) of the auxiliary rods 9 and the main rods 10 adjoining one another. Each of the rotary links 12 includes radially outward and radially inward link portions 12A and 12B arranged at radially outward and inward sides with respect to the rotational axle X1, and an intermediate portion 12C connecting the radially outward link portion 12A to the radially inward link portion 12B. The auxiliary rod 9 and the main rod 10 are sandwiched between the radially outward link portion 12A and the radially inward link portion 12B that have rectangular shapes when seen in side view.

The rotary link 12 includes first and second ends in a longitudinal direction (circumferential direction). As illustrated in FIGS. 1A and 1B, the rotary link 12 is supported to the auxiliary rod 9 by a slidable pivot pin 13B (first pivot portion) supported slidably in the longitudinal direction by an elongated bore 12H formed in the first end of the rotary link 12. Further, the rotary link 12 is supported to the main rod 10 by a fixed pivot pin 13A (second pivot portion) fixed to the second end of the rotary link 12 so as not to move. When the second outer mold 4 is in the molding position in which the first movable plate 6 is arranged on the upper surface of the base 1, the elongated bore 12H extends substantially horizontally along the longitudinal direction of the movable link 12 so that the orientation of the rotary link 12 may vary in a state where the auxiliary rod 9 and the main rod 10 are maintained in a parallel position to each other.

Figure 7A:
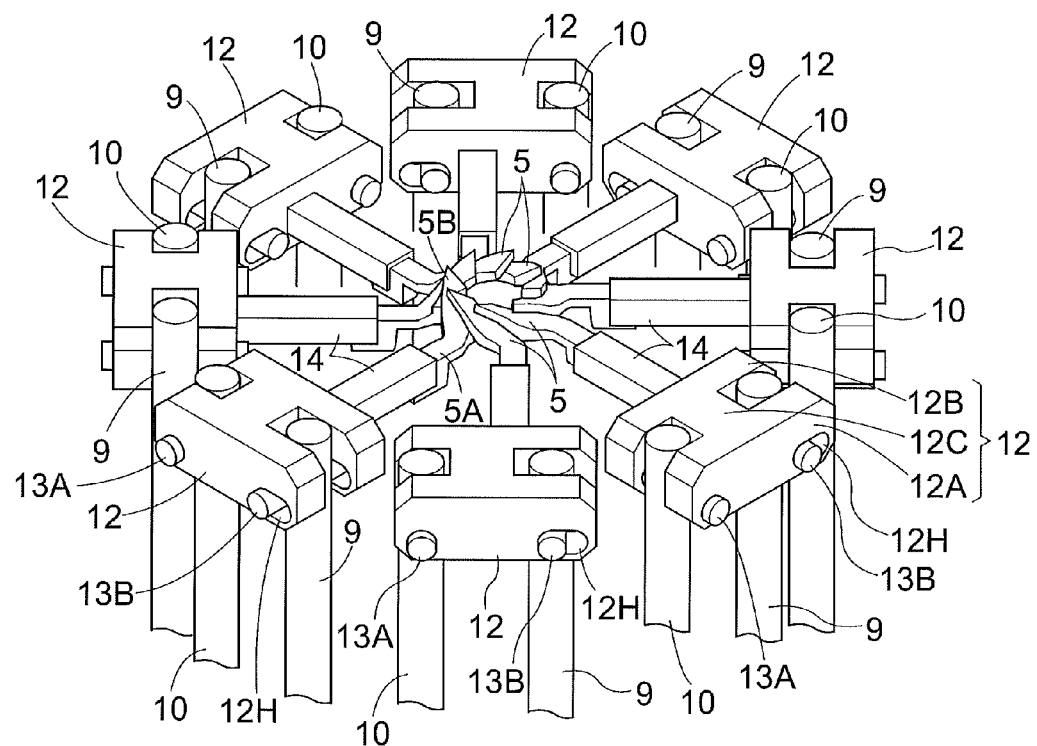
FIG. 7A is a perspective view illustrating a state where the resin-molded impeller is removed from the molding device of FIG. 1.
Figure 7B:
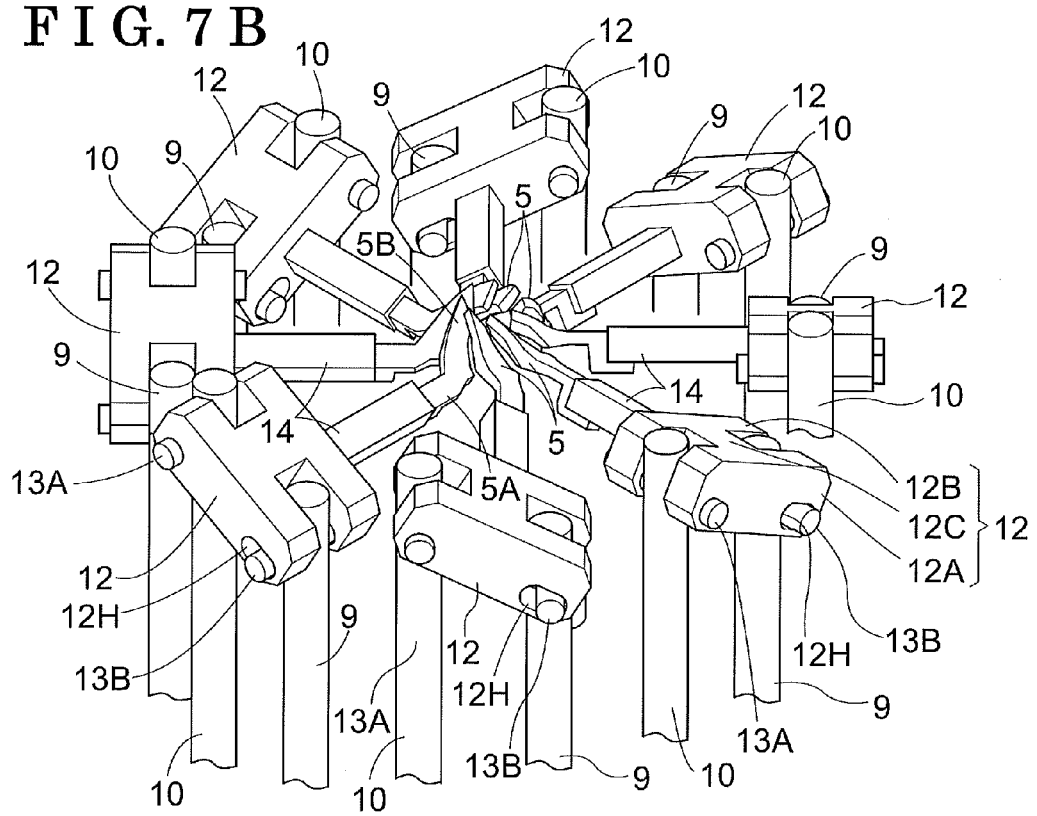
FIG. 7B is a perspective view illustrating a state where the resin-molded impeller is removed from the molding device of FIG. 2.

As illustrated in FIG. 7A, the cores 5 described above are attached to ends of support arms 14 extending perpendicularly from radially inward surfaces of the respective radially inward link portions 12B toward a portion being in the vicinity of the rotational axle X1. That is, the cores 5 are supported by the rotary links 12 from the radially outward side of the rotary links 12. As illustrated in FIGS. 7A and 7B, each of the cores 5 includes a base end portion 5A and a tip end portion 5B. The base end portion 5A linearly extends from each of the support arms 14 toward the portion being in the vicinity of the rotational axle X1. The tip end portion 5B extends from the base end portion 5A so as to be curved along the inner circumferential surface of the cylindrical portion 51A of the impeller 50 in a clockwise fashion as seen in a planar view of FIG. 7A. The base end portions 5A of the cores 5 form the blades 52 and a portion at a radially outward side of the lower surface of the flange portion 51B of the main body 51. The tip end portions 5B of the cores 5 form the blades 52 and a portion extending in a range defined between the inner circumferential surface of the cylindrical portion 51A and a portion at a radially inward side of the lower surface of the flange portion 51B. Protrusions are arranged at respective lower surfaces of the tip end portions 5B so as to be engaged with the first outer mold 3A. The protrusions of the tip end portions 5B inhibit the tip end portions 5B from being elastically deformed by a pressure of the resin during the resin injection molding process of the impeller 5.

As illustrated in FIG. 8B, the support arm 14 is arranged closer to the elongated bore 12H than to an intermediate portion of the rotary link 12 in the circumferential direction of the rotary link 12. The core 5 extends obliquely upward from the end of the support arm 14 toward the main rod 10; therefore, the tip end portion 5B of the core 5 is positioned in the vicinity of an intermediate position between the elongated bore 12H and the fixed pivot pin 13A so as to be above the fixed pivot pin 13A. In particular, upper edges of the tip end portions 5B of the cores 5 extend along a circular arc defined by inner ends of central axes of the fixed pivot pins 13A in the radial direction of the impeller 50 (each of the central axes corresponds to a rotational axis X3 of the core 5).

Figure 6:
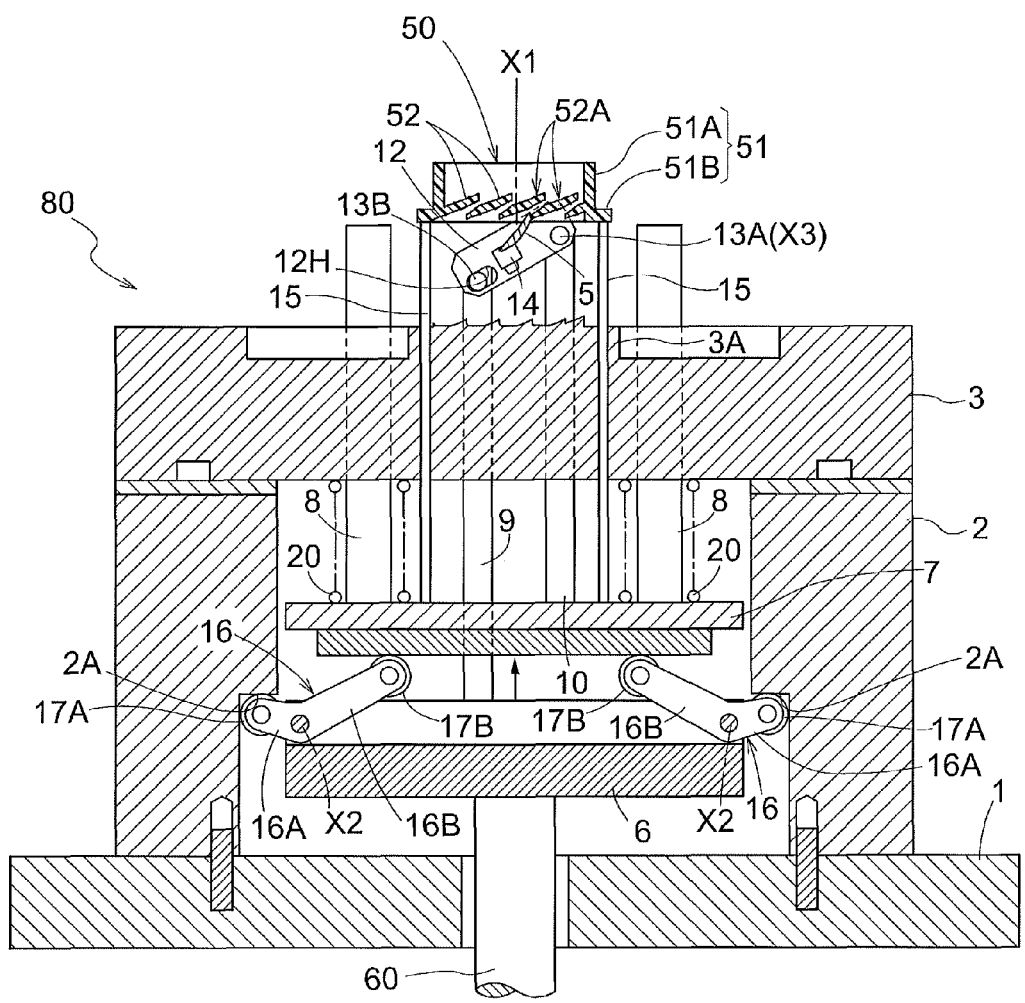
FIG. 6 is a side view illustrating a change of the main portion of the molding device in the process of the molding method according to the embodiment disclosed here.

As illustrated in FIG. 1A, the plural blades 52 and the radially inward end portions 5B of the plural cores 5 are arranged so as to adjoin one another in a substantially annular form around the rotational axle X1 of the impeller 50. Meanwhile, the plural blades 52 and the radially inward end portions 5B (the plural cores 5) are substantially linearly laid out in a horizontal direction so as to be easily seen in FIGS. 8A, 8B and 8C, In addition, as illustrated in FIG. 6, at least a pair of lever devices 16 (speed increasing mechanisms) being rotatable about respective central axes X2 is supported by a portion at an outer circumferential side of the first movable plate 6. The central axes X2 of the lever devices 16 are arranged along a circumferential direction of the first movable plate 6. Each of the lever devices 16 includes a radially outward arm portion 16A extending radially outwardly from the central axis X2 and a radially inward arm portion 16B extending radially inwardly from the central axis X2. A radially outward roller 17A (first end portion) is rotatably supported by an end of the radially outward arm portion 16A and a radially inward roller 17B (second end portion) is rotatably supported by an end of the radially inward arm portion 16B. The radially inward arm portion 16B is designed to be substantially longer than the radially outward arm portion 16A. Contact surfaces 2A facing downward as seen in FIG. 6 and constituting portions of a main body of the molding device 80 are formed at inner surfaces of the wall portions 2. The contact surfaces 2A are contactable with the radially outward rollers 17A in accordance with the rotation of the lever devices 16 about the central axes X2.

[Molding Method for Forming the Impeller]

First, the second outer mold 4 is firmly clamped with the upper surface of the first outer mold 3A in a state where the first movable plate 6 is positioned on the upper surface of the base 1 as illustrated in FIG. 4. In such state, the substantially annular cavity is formed between the second outer mold 4 and an outer circumferential side of the boss portion of the first outer mold 3A.

In the condition that the second outer mold 4 is firmly clamped with the upper surface of the first outer mold 3A, the orientation of each of the rotary links 12 is maintained to be horizontal as illustrated in FIG. 7A. In addition, the eight cores 5 are arranged in the annular form along the outer circumferential side of the boss portion of the first outer mold 3A. At this time, as illustrated in FIG. 8A, the cores 5 are slightly inclined relative to a horizontal surface and are in contact with both the upper surface of the first outer mold 3A and a lower surface of the second outer mold 4. The resin is injected from a resin injection gate into the cavity formed by the second outer mold 4, the cores 5, and the first outer mold 3A that includes the boss portion (such process corresponds to a resin injection process).

A mold removing process of the molding method according to the embodiment will be explained as follows. In a first step of the mold removing process, after the resin is hardened, the second outer mold 4 is removed upward from the first outer mold 3A. Then, the first movable plate 6 is moved linearly upward (toward a first direction in the vertical direction seen in FIG. 4) by the drive shaft 60 at a predetermined speed; thereafter, the radially outward rollers 17A of the lever devices 16 start making contact with the contact surfaces 2A of the wall portions 2 as illustrated in FIG. 5. A process right before the radially outward rollers 17A make contact with the contact surfaces 2A will be referred to as a second step of the mold removing process. In the second step, the first movable plate 6 and the second movable plate 7 move upward together with the drive shaft 60, therefore moving all of the eight extrusion pins 15, the eight auxiliary rods 9, and the eight main rods 10 upward in the same way as the drive shaft 60 moves upward.

As a result, the impeller 50 corresponding to the resin-molded impeller is lifted upward from the first outer mold 3A by the eight extrusion pins 15. At this time, the rotary links 12 supported by the auxiliary rods 9 and the main rods 10 simultaneously move upward while being maintained in the horizontal position. Therefore, the cores 5 move upward together with the resin-molded impeller 50 while being maintained in the inclined state established when the resin is injected in the cavity. As a result, as illustrated in FIGS. 5 and 8B showing a final stage of the second step, the first outer mold 3A is released from the second outer mold 4 so as to have an opened portion facing the upward direction (a process from the aforementioned first step to the aforementioned second step corresponds to a first movement phase of the mold removing process of the molding method according to the embodiment).

After the radially outward rollers 17A start making contact with the contact surfaces 2A as described above, the drive shaft 60 moves the first movable plate 6 further upward. Then, the first movable plate 6 moves upward to a top dead point in accordance with the rotation of the lever devices 16 as illustrated in FIG. 6. A process from the time when the radially outward rollers 17A start making contact with the contact surfaces 2A to the time when the first movable plate 6 is moved upward to the top dead point will be referred to as a third step of the mold removing process.

In the third step corresponding to a second movement phase of the mold removing process of the molding method according to the embodiment, the second movable plate 7 is moved upward to the upper side of the first movable plate 6 by the radially inward arm portions 16B of the lever devices 16 against the biasing forces of the compression springs 20 in accordance with the rotation of the lever devices 16. Consequently, the extrusion pins 15 and the main rods 10 arranged at the second movable plate 7 move upward at a slightly high speed. On the other hand, the auxiliary rods 9 arranged at the first movable plate 6 move upward at a speed that is slower than the speed at which the extrusion pins 15 and the main rods 10 move upward. As a result, as illustrated in FIG. 6 the rotary links 12 are rotated downward relative to the main rods 10 about the rotational axes X3 of the cores 5 (the aforementioned rotational axes X3 correspond to the central axes of the fixed pivot pins 13A). Each of FIGS. 6, 7B, and 8C illustrates a final stage of the third step.

As described above, the cores 5 supported by the support arms 14 and positioned at a radially inward side of the rotary links 12 are removed obliquely downward from the blade surfaces 52A (upper blade surfaces) and lower blade surfaces of the blades 52 of the resin-molded blade 50 toward the aforementioned opened portion of the first outer mold 3A in accordance with the simple rotation of the rotary links 12. Thus, the molding device 80 according to the embodiment does not require a mechanism provided with bearings and the like for allowing the cores 5 to rotate without resistance about the rotational axes X3 extending along a direction in which the cores 5 are separated from the resin-molded impeller 50. Accordingly, the molding device 80 may be manufactured at low cost. In addition, the upper and lower blade surfaces that configure portions of each of the blades 52 are inclined at different inclination angles at radially outward and inward sides toward one side relative to the rotational axle X1 in the circumferential direction of the impeller 50. Shapes of the upper and lower blade surfaces of the blade 52 and each of the rotational axes X3 are designed so that portions of each of the cores 5 may initially trace circular arcs along the inclinations of the upper and lower blade surfaces at arbitrary points between the radially outward side and the inward side of the impeller 50 when the cores 5 rotate about the rotational axes X3 in the third step. Consequently, the cores 5 are smoothly separated from the upper and lower blade surfaces of the blades 52 in the third step.

After the cores 5 are completely separated from the first outer mold 3A as described above, the resin-molded impeller 50 positioned on respective upper ends of the extrusion pins 15 may be detached therefrom. Afterward, as the first movable plate 6 is continuously moved downward by the drive shaft 60, the second movable plate 7 biased downward by the compression springs 20 is moved downward by the function of the lever devices 16 at a speed higher than a moving speed of the first movable plate 6 in a state where the radially outward rollers 17A are being maintained in contact with the contact surfaces 2A (such downward movement of the first movable plate 6 and the second movable plate 7 is performed in reverse order relative to the order from the second step to the third step). As a result, the rotary links 12 are returned to the horizontal position. Thereafter, the first movable plate 6 and the second movable plate 7 are moved downward at the substantially same speed by the drive shaft 60 from the time when the radially outward rollers 17A start separating from the contact surfaces 2A. As s result, the cores 5 are returned to the molding position in which the cores 5 are in contact with the first outer mold 3A. At this time, the second outer mold 4 is firmly clamped with the first outer mold 3A; thereby, the resin may be again injected into the injection mold.

The embodiment of the disclosure may be modified as follows. According to the embodiment, the elongated bores 12H are formed in the rotary links 12. Alternatively, elongated bores may be formed in the auxiliary rods 9 or the auxiliary rods 9 may be elastically deformed so that the respective upper ends of the auxiliary rods 9 are moved close to the respective upper ends of the main rods 10.

Further, the embodiment of the disclosure may be modified as follows. The molding method according to the embodiment is adapted to the impeller 50 configured so that the blades 52 are arranged at an inner side of the main body 51, that is, the molding method according to the embodiment is adapted to the impeller 50 corresponding to an impeller including inner blades. Alternatively, the molding method according to the embodiment may be applied to an impeller including outer blades arranged at an outer side of a main body of the impeller.

Furthermore, the embodiment of the disclosure may be modified as follows. According to the embodiment, the central axes of the fixed pivot pins 13A and the rotational axes X3 of the cores 5 extend along a flat surface (horizontal surface) that is perpendicular to the rotational axle X1 of the impeller 50. Alternatively, the central axes of the fixed pivot pins 13A and the rotational axes X3 of the cores 5 may be inclined obliquely upward or obliquely downward relative to the aforementioned flat surface.

The molding method for forming the impeller 50 and the molding device 80 for the same according to the embodiment of the disclosure may be utilized as a technique to form an impeller including a main body and plural blades that are arranged at the main body so as to circumferentially adjoin one another.

As described above, according to the aforementioned embodiment, the molding method for forming the impeller 50 having the main body 51 and the plural blades 52 arranged at the inner surface of the main body 51 to circumferentially adjoin one another, each of the blades 52 being inclined at the different inclination angles at the radially outward side and the inward side toward the one side in the rotating direction (circumferential direction) of the impeller 50, the molding method including the mold clamping process having the first outer mold 3A for forming the lower side of the blades 52, the second outer mold 4 firmly clamped with the first outer mold 3A to face the first outer mold 3A, and the cores 5 arranged at the first outer mold 3A relative to the blades 52, the mold clamping process clamping the first outer mold 3A to the second outer mold 4 in a state where the cores 5 are arranged between the first outer mold 3A and the second outer mold 4, the injecting process injecting the resin in the cavity obtained by the mold clamping process, and the mold removing process including the steps of releasing at least the first outer mold 3A from the clamped state obtained by the mold clamping process to generate the opened portion in the first outer mold 3A after the resin is hardened, rotating the cores 5 about the rotational axes X3 toward the opened portion of the first outer mold 3A, the rotational axes X3 extending from the radially outward side to the radially inward side of the impeller 50, and separating the cores 5 from the resin-molded impeller 50.

According to the molding method of the aforementioned embodiment, the cores 5 are rotated about the rotational axes X3 extending along the radial direction from the radially outward side to the radially inward side of the impeller 50, thereby separating the cores 5 from the resin-molded impeller 50. As a result, the mechanism to remove the cores 5 from the resin-molded impeller 50 may be simply configured. In addition, such mechanism does not require a large space in the radial direction of the impeller 50, compared to the known mechanism to separate the cores toward the outward side in the radial direction of the die-cast impeller.

According to the aforementioned embodiment, the mold removing process includes the first movement phase for separating the resin-molded impeller 50 in contact with the cores 5 from the first outer mold 3A along the rotational axle X1 of the impeller 50, and the second movement phase for rotating the cores 5 about the rotational axes X3 in the middle of the first movement phase.

According to the molding method of the aforementioned embodiment, the cores 5 being in contact with the resin-molded impeller 50 are firstly moved upward along the rotational axle X1 in the first movement phase. Accordingly, the opened portion into which the cores 5 separated from the resin-molded impeller 50 are moved may be obtained in the upward direction. Next, the cores 5 are rotated about the rotational axes X3 in a state where the resin-molded impeller 50 is being moved further upward. Consequently, the cores 5 are appropriately separated from the resin-molded impeller 50 so as to be moved into the opened portion.

According to the aforementioned embodiment, the molding device 80 for forming the impeller 50 including the main body 51 and the plural blades 52 arranged at the inner surface of the main body 51 to circumferentially adjoin one another, each of the blades 52 being inclined at the different inclination angles at the radially outward side and the inward side toward the one side in the rotating direction of the impeller 50, the molding device 80 including the first outer mold 3A forming the lower side of the blades 52, the second outer mold 4 firmly clamed with the first outer mold 3A to face the first outer mold 3A, the cores 5 arranged at the first outer mold 3A relative to the blades 52 and being rotatable about the rotational axes X3, the rotational axes X3 extending from the radially outward side to the radially inward side of the impeller 50, the resin injecting mechanism injecting the resin in the cavity formed by the first outer mold 3A, the second outer mold 4, and the cores 5, and the mold removing mechanism releasing at least the first outer mold 3A clamped with the second outer mold 4 therefrom to form the opened portion in the first outer mold 3A after the resin is hardened, rotating the cores 5 about the rotational axes X3 toward the opened portion of the first outer mold 3A, and separating the cores 5 from the resin-molded impeller 50.

As described above, according to the molding device 80 of the aforementioned embodiment, the cores 5 are rotated about the rotational axes X3 extending along the radial direction from the radially outward side to the radially inward side of the impeller 50, thereby separating the cores 5 from the resin-molded impeller 50. As a result, the mechanism to remove the cores 5 from the resin-molded impeller 50 may be simply configured. In addition, such mechanism does not require the large space in the radial direction of the impeller 50, compared to the known mechanism to separate the cores toward the outward side in the radial direction of the die-cast impeller.

According to the aforementioned embodiment, the resin injecting mechanism includes the extrusion pins 15 arranged at the lower side of the resin-molded impeller 50 to move the resin-molded impeller 50 toward the upward direction in which the resin-molded impeller 50 is separated from the first outer mold 3A along the rotational axle X1 of the impeller 50, and the rotary links 12 supporting the cores 5 from the radially outward side of the impeller 50 and rotating the cores 5 about the rotational axes X3 in the middle of the movement of the resin-molded impeller 50 by the extrusion pins 15 toward the upward direction.

According to the molding device 80 of the embodiment, until the middle of the upward movement of the resin-molded impeller 50 by the extrusion pins 15, the rotary links 12 supporting the cores 5 move upward together with the resin-molded impeller 50 while being maintained in the horizontal orientation obtained when the resin is injected in the cavity. Accordingly, the first outer mold 3A forming the lower side of the blades 52 is released from the clamped state so as to have the opened portion facing the upward direction; therefore, the opened portion in which the cores 5 separated from the resin-molded impeller 50 are moved may be obtained. Next, the rotary links 12 rotate the cores 5 about the rotational axes X3 from the middle of the upward movement of the resin-molded impeller 50 by the extrusion pins 15. As a result, the cores 5 are separated from the resin-molded impeller 50. That is, according to the molding device 80 of the embodiment, the upward movement of the resin-molded impeller 50 by the extrusion pins 15 may be performed simultaneously with the rotation of the cores 5 about the rotational axes X3, thereby increasing efficiency of the molding process of the impeller 50.

According to the aforementioned embodiment, the molding device 80 further includes the speed increasing mechanism 16. Each of the rotary links 12 includes the slidable pivot pin 13B slidably and pivotally supported by the auxiliary rod 9 being movable toward the upward direction, and the fixed pivot pin 13A pivotally supported by the main rod 10 integrally moving with the resin-molded impeller 50 and being movable relative to the auxiliary rod 9. The speed increasing mechanism 16 allows the second movable plate 7 to move at the speed higher than the moving speed of the first movable plate 6 toward the upward direction to rotate the rotary links 12.

According to the configuration of the molding device 80 of the aforementioned embodiment, the first movable plate 6 and the second movable plate 7 are moved toward the same direction to each other so as to move at the different speeds with respect to each other, thereby rotating the rotary links 12. As a result, the molding device 80 having the simple configuration may be easily obtained. In addition, according to the configuration of the molding device 80 of the aforementioned embodiment, the second movable plate 7 may move at the speed higher than the moving speed of the first movable plate 6 in a state where the moving speed of the first movable plate 6 is maintained. Therefore, the first outer mold 3A may be inhibited from being cooled and the molding time of the impeller 50 (for example, a time required to separate the first outer mold 3A from the resin-molded impeller 50) may be reduced.

According to the aforementioned embodiment, the speed increasing mechanism 16 includes the lever devices 16 pivotally supported by the first movable plate 6. In a case where the first movable plate 6 moves linearly toward the upward direction, the lever devices 16 rotate to bring the radially outward rollers 17A of the lever devices 16 into contact with the contact surfaces 2A of the main body of the molding device 80 to accelerate the movement of the second movable plate 7 toward the upward direction by the radially inward rollers 17B of the lever devices 16.

According to the configuration of the molding device 80 of the aforementioned embodiment, while the first movable plate 6 is being moved linearly upward, the second movable plate 7 is automatically moved at the speed higher than the moving speed of the first movable plate 6 by the radially inward rollers 17B of the lever devices 16. Thus, the first movable plate 6 is driven by the driven shaft 60; thereby, the second movable plate 7 is moved upward in conjunction with the first movable plate 6. As a result, the speed increasing mechanism may be reasonably configured.

According to the aforementioned embodiment, the first support member includes the first movable plate 6 reciprocating along the rotational axle X1 and the plural auxiliary rods 9 vertically arranged at the first movable plate 6 in the annular form, and the second support member includes the second movable plate 7 supported by the first movable plate 6 so as to move relative thereto along the rotational axle X1 and the plural main rods 10 vertically arranged at the second movable plate 7 in the annular form. Each of the rotary links 12 is pivotally arranged between the upper end of each of the auxiliary rods 9 and the upper end of each of the main rods 10, the auxiliary rods 9 and the main rods 10 adjoining one another in an alternating manner.

According to the configuration of the molding device 80 of the aforementioned embodiment, the same number of auxiliary rods 9 as the blades 52 and the same number of main rods 10 as the blades 52 are arranged at the first movable plate 6 and the second movable plate 7, respectively. Therefore, the required number of the cores 5 for forming the plural blades 52 may be moved in conjunction with one another between the molding position and the mold removed position in which the cores 5 are separated from the resin-molded impeller 50.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A molding method for forming an impeller including a main body and a plurality of blades arranged at one surface of the main body to circumferentially adjoin one another, each of the blades being inclined at different inclination angles at radially outward and inward sides toward one side in a rotating direction of the impeller, the molding method comprising:
a mold clamping process including a first mold for forming one side of the blades, a second mold firmly clamped with the first mold to face the first mold, and a core arranged at the first mold relative to the blades, the mold clamping process clamping the first mold to the second mold in a state where the core is arranged between the first mold and the second mold;
an injecting process injecting resin in a cavity obtained by the mold clamping process; and
a mold removing process including the steps of:
releasing at least the first mold from the clamped state obtained by the mold clamping process to generate an opened portion in the first mold after the resin is hardened,
rotating the core about a rotational axis toward the opened portion of the first mold, the rotational axis extending from the radially outward side to the radially inward side of the impeller, and
separating the core from the resin-molded impeller,
wherein the mold removing process includes a first movement phase for separating the resin-molded impeller in contact with the core from the first mold along a rotational axle of the impeller, and a second movement phase for rotating the core about the rotational axis in the middle of the first movement phase.

2. A molding device for forming an impeller including a main body and a plurality of blades arranged at one surface of the main body to circumferentially adjoin one another, each of the blades being inclined at different inclination angles at radially outward and inward sides toward one side in a rotating direction of the impeller, the molding device comprising:
a first mold forming one side of the blades;
a second mold firmly clamped with the first mold to face the first mold;
a core arranged at the first mold relative to the blades and being rotatable about a rotational axis, the rotational axis extending from the radially outward side to the radially inward side of the impeller;
a resin injecting mechanism injecting resin in a cavity formed by the first mold, the second mold, and the core; and
a mold removing mechanism releasing at least the first mold clamped with the second mold therefrom to form an opened portion in the first mold after the resin is hardened, rotating the core about the rotational axis toward the opened portion of the first mold, and separating the core from the resin-molded impeller,
wherein the resin injecting mechanism includes a support device arranged at a lower side of the resin-molded impeller to move the resin-molded impeller toward a first direction in which the resin-molded impeller is separated from the first mold along a rotational axle of the impeller, and a rotary member supporting the core from the radially outward side of the impeller and rotating the core about the rotational axis in the middle of the movement of the resin-molded impeller by the support device toward the first direction.

3. The molding device according to claim 2, further comprising a speed increasing mechanism, wherein the rotary member includes a first pivot portion slidably and pivotally supported by a first support member being movable toward the first direction, and a second pivot portion pivotally supported by a second support member integrally moving with the resin-molded impeller and being movable relative to the first support member, and wherein the speed increasing mechanism allows the second support member to move at a speed higher than a moving speed of the first support member toward the first direction to rotate the rotary member.

4. The molding device according to claim 3, wherein the speed increasing mechanism includes a lever device pivotally supported by the first support member, and wherein in a case where the first support member moves linearly toward the first direction, the lever device rotates to bring a first end portion of the lever device into contact with a portion of a main body of the molding device to accelerate the movement of the second support member toward the first direction by a second end portion of the lever device.

5. The molding device according to claim 3, wherein the first support member includes a first movable plate reciprocating along the rotational axle and a plurality of auxiliary rods vertically arranged at the first movable plate in an annular form, and the second support member includes a second movable plate supported by the first movable plate so as to move relative thereto along the rotational axle and a plurality of main rods vertically arranged at the second movable plate in an annular form, and wherein the rotary member is pivotally arranged between an end of each of the auxiliary rods and an end of each of the main rods, the auxiliary rods and the main rods adjoining one another in an alternating manner.

* * * * *